United States Patent
Bhaskar et al.

(10) Patent No.: US 8,055,596 B2
(45) Date of Patent: Nov. 8, 2011

(54) SYSTEM AND METHOD FOR DEVELOPING A PROPENSITY MODEL

(75) Inventors: Tarun Bhaskar, Bangalore (IN); Ramasubramanian Gangaikondan Sundararajan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 975 days.

(21) Appl. No.: 11/971,126

(22) Filed: Jan. 8, 2008

(65) Prior Publication Data
US 2009/0177599 A1   Jul. 9, 2009

(51) Int. Cl.
G06F 15/18  (2006.01)
G06N 3/00  (2006.01)

(52) U.S. Cl. .............................. 706/13; 706/12; 706/62

(58) Field of Classification Search .................. None
See application file for complete search history.

(56) References Cited

U.S. PATENT DOCUMENTS
7,801,839 B2 * 9/2010 Kates et al. ................ 706/21
2005/0234688 A1 * 10/2005 Pinto et al. .................. 703/6

OTHER PUBLICATIONS

Diamond et al., A., "Genetic Matching for Estimating Causal Effect: A General Multivariate Matching Method for Achieving Balance in Observational Studies", Midwest Political Science Association, pp. 1-45, Apr. 7-10, 2005.*

Lee, W., "Propensity Score Matching and Variations on the Balancing Test", Melbourne Institute of Applied Economic and Social Research, pp. 1-48, Nov. 3, 2005.*

Sekhon, J., "Muiltivariate and Propensity Score Matching Software with Automated Balance Optimization: The Matching package for R". Journal of Statistical Software, pp. 1-47, 2007.*

Joffe et al., M., "Invited Commentary: Propensity Scores", American Journal of Epidemiology, pp. 1-7, Aug. 15, 1999.*

Sekhon, J., "Alternative Balance Metrics for Bias Reduction in Matching Methods for Causal Inference", pp. 1-21, Jan. 16, 2007.*

* cited by examiner

*Primary Examiner* — Jeffrey A Gaffin
*Assistant Examiner* — Adrian Kennedy
(74) *Attorney, Agent, or Firm* — Fletcher Yoder, P.C.

(57) ABSTRACT

A technique is provided for developing a propensity model for customer behavior. Multiple biased samples of customer characteristics and results from past activities are established. Initial propensity models are created for each biased sample. The propensity models established for each biased sample are processed separately from the propensity models established for the other biased samples. A genetic algorithm is used to evolve the propensity models. A select number of propensity models that best fit their respective biased samples are compared to a validation sample that is unbiased. A select number of these propensity models that best fit the validation sample are cross-bred into the propensity models established for each biased sample. The propensity models for each biased sample are then processed again using the genetic algorithms. However, a number of elite propensity models are maintained in their original form and not evolved using the genetic algorithm. This cycle continues until a stopping criterion is reached.

21 Claims, 12 Drawing Sheets

$$f(x) = \beta_0 + \beta_1 x_1 + \beta_2 x_2 + \ldots + \beta_n x_w, Y \in \{0, 1\}$$

FIG. 13

SYSTEM AND METHOD FOR DEVELOPING A PROPENSITY MODEL

BACKGROUND

The invention relates generally to modeling customer behavior. In particular, the invention relates to developing a propensity model for a customer's behavior based on past interactions with a plurality of customers and having a low event rate.

Good customer relationship management (CRM) has become a valuable tool in today's highly competitive markets. CRM enables a business to know who its customers are, what its customers buy, how much its customers earn, how much its customers spend and other similar types of information that allow a company to understand the market for its goods and/or services. This information also helps a company to find out the propensity of its customer for a particular behavior, such as how likely the customer is to respond to an offer, how likely the customer is to default on a loan, or pay off a loan early, etc. One method of predicting customer behavior that businesses have used is to build a propensity model from data obtained from experience with existing customers. For this purpose, companies maintain databases of their customers replete with data from previous transactions, conduct surveys, or customer response sheets.

One problem associated with propensity modeling in consumer finance business is that the rate that an event of interest has occurred, the event rate, in some cases may turn out to be very low. However, the economic benefits even with a low success rate may justify pursuing the opportunity in the future. For example, an organization may send out thousands, perhaps millions, of offers in the mail, but only a small percentage of customers may respond. Indeed, some of the data used in propensity modeling may have an event rate of less than one percent. This means that for an offer made to one thousand customers less than ten customers actually responded to the offer. This makes the development of an accurate propensity model for this type of event very difficult. Existing propensity modeling techniques that attempt to overcome the problems caused by a low event rate have resulted in models that memorize specific characteristics of the training sample. These models do not have good generalization abilities for the population of data as a whole.

Therefore, there is a need for a technique that improves an organization's ability to target specific customers most likely to engage in an event when the rate of the event for all customers is low based on past performance. In particular, a technique is desired that would enable an accurate propensity model of customer behavior to be developed for activities having a low event rate.

BRIEF DESCRIPTION

A technique is provided for developing a propensity model for customer behavior. A number of different biased samples of customer characteristics and results from past activities are drawn. Preferably, each sample is biased to include all of the data points from all past activities that resulted in the desired behavior. The biased samples differ in the number of data points from past activities that did not result in the desired behavior. Propensity models are initiated for each biased sample. The propensity models established for each biased sample are processed separately from the propensity models established for the other biased samples. The propensity models are processed using genetic algorithms to evolve the propensity models. After a specified interval, a select number of propensity models for each biased sample that best fit their respective biased samples are compared to a validation sample that is unbiased. A select number of these propensity models that best fit the validation sample are cross-bred into the propensity models established for each biased sample. The propensity models for each biased sample are then processed again using the genetic algorithms. However, a number of elite propensity models are maintained in their original form and not evolved using the genetic algorithm. Once again, after a specified interval, a select number of propensity models for each biased sample that best fit their respective biased samples are compared to a validation sample that is unbiased. A select number of these propensity models that best fit the validation sample are cross-bred into the propensity models established for each biased sample. In addition, a new set of elite propensity models also is selected. This cycle continues until a stopping criterion is reached. The propensity model that best fits the validation sample when the stopping criterion is reached may be used to model customer behavior.

DRAWINGS

These and other features, aspects, and advantages of the present invention will become better understood when the following detailed description is read with reference to the accompanying drawings in which like characters represent like parts throughout the drawings, wherein:

FIG. 13 is an embodiment of a final propensity model developed, in accordance with an alternative exemplary embodiment of the present technique.

DETAILED DESCRIPTION

Figure 1:
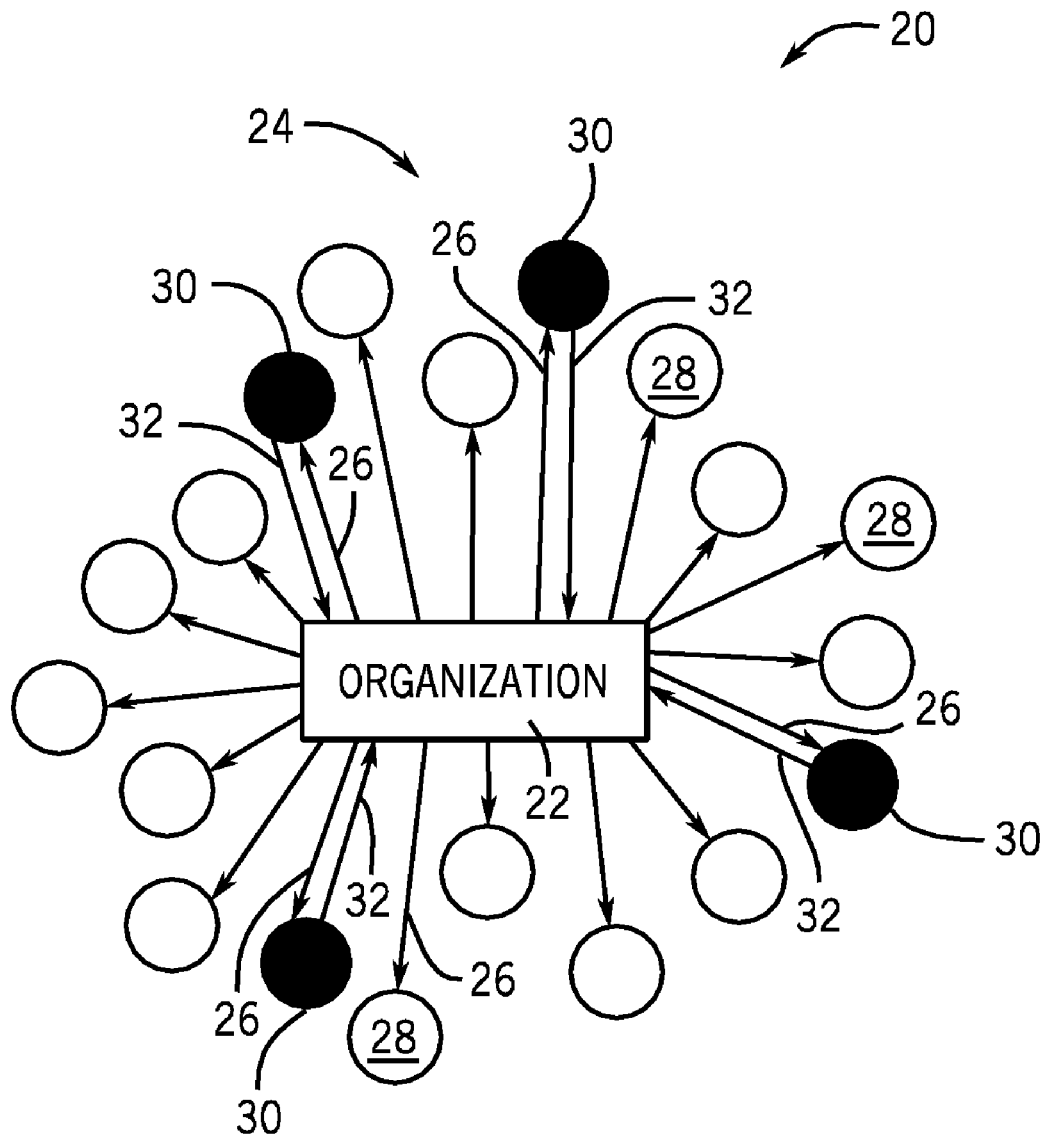
FIG. 1 is a schematic representation of a system for engaging customers/clients/partners, in accordance with an exemplary embodiment of the present technique.

Referring now to FIG. 1, the present invention will be described as it might be applied in conjunction with an exemplary technique for predicting the propensity of a particular event to occur, as represented generally by reference numeral 20. For example, the technique enables the propensity of a customer to accept a commercial offer made by a business to be predicted. In the illustrated embodiment, an organization 22 has a large number of potential customers, represented generally by reference numeral 24. The organization may be any type organization that engages in transactions with an outside organization or entity. In this embodiment, the organization 22 in the past has made an offer 26 to each of its customers 24. A large number of customers 24, represented generally by reference numeral 28, rejected the offer 26 in the past. Therefore, the rate of this event occurring, a customer rejecting the offer, is very high. However, a small number of customers, represented generally by reference numeral 30, have replied to an offer 26 with an acceptance 32 of the offer 26. Thus, the rate for this event, a customer accepting the offer, is low. From these past experiences, a propensity model may be developed to predict the propensity of a given customer, or type of customer to accept an offer in the future. However, propensity models for other types of behavior may be developed. For example, a propensity model may be developed for the likelihood of a customer to default on a loan.

Figure 2:
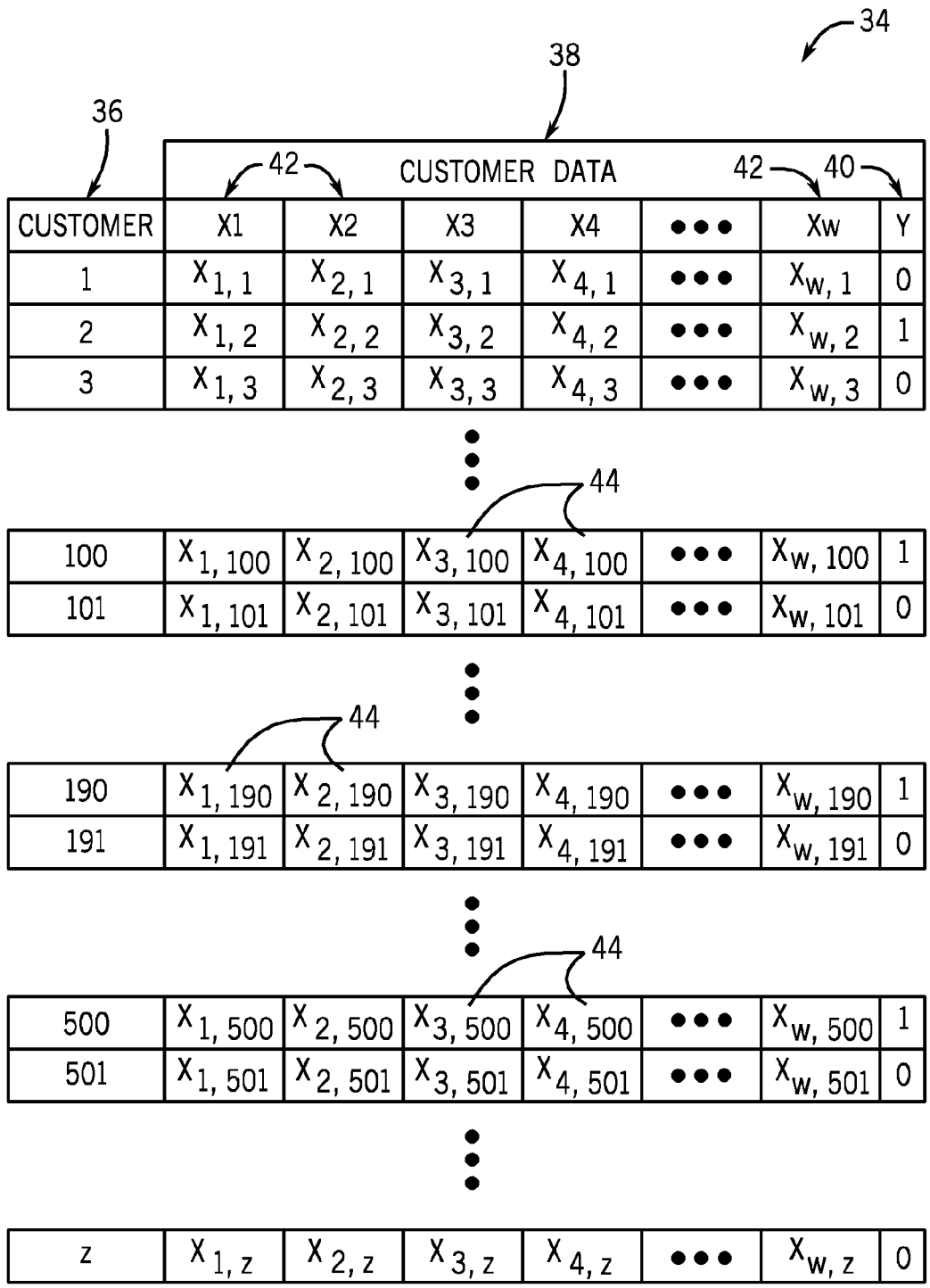
FIG. 2 is a representation of a database comprising customer data from previous attempts at engaging the customers, in accordance with an exemplary embodiment of the present technique.

Referring generally to FIG. 2, the technique utilizes a database of data regarding past offers made to the customers, represented generally by reference numeral 34, to develop a model of the propensity of a customer or type of customer to accept an offer made in the future. In the illustrated embodiment, the database 34 comprises a list of customers 36 and data 38 representative of the customer. Each row of the database corresponds to a specific customer and each column corresponds to a different element of the customer data 38. The customer data 38 may be information which the company has obtained from previous transactions with the customer, or information obtained from a third party, such as a credit scoring agency.

In particular, the customer data 38 also comprises customer response data, "y", 40 corresponding to the customer's response to an offer in the past. In this embodiment, the response data 40 is in binary form. In this embodiment, the customer response data 40 has the value "1" if the customer accepted a past offer. Conversely, the response data 40 has the value "0" if the customer did not accept the past offer. However, the response may be a different range of values in other propensity models. A customer may be represented more than once in the list of customers 36 depending upon their response to a particular offer. For example, an offer that was made to a customer that was accepted may be represented in the database 34 and a separate entry may exist for the customer in the database for a different offer made to the customer that was declined. In this embodiment, the acceptance rate for customers responding to an offer is very low, only four acceptances out of over five hundred offers made to customers.

The customer data 38 also includes customer characteristic data, represented generally by reference numeral 42. In this embodiment, each customer characteristic, "X", has its own column in the database 34 and the database is adapted to store a plurality of different customer characteristics, "$X_1$ to $X_W$". The customer characteristics may be the age of the customer, the annual income of the customer, the geographic location of the customer, the area of employment of the customer, etc.

In the illustrated embodiment, each customer characteristic 42 and the response data 40 for each offer are stored in a data box 44. For example, a data box 44 is used to store the value of a first customer characteristic, "$X_1$", of a first customer, "1". The value corresponding to the first characteristic, "$X_1$", of the first customer, "1", is represented in the data box 44 as "$X_{1,1}$". The first "1" in the subscript corresponds to the first customer characteristic and the second "1" in the subscript corresponds to the first customer. As noted above, the first characteristic, "$X_1$", may be the customer's age, the customer's annual income, etc. Similarly, a data box 44 is used to store the value of a second customer characteristic, "$X_2$", of the first customer, "1". The value corresponding to the second characteristic, "$X_2$", of the first customer, "1" is represented in the data box 44 as "$X_{2,1}$". The "2" in the subscript corresponds to the second customer characteristic and the "1" in the subscript corresponds to the first customer.

Figure 3:
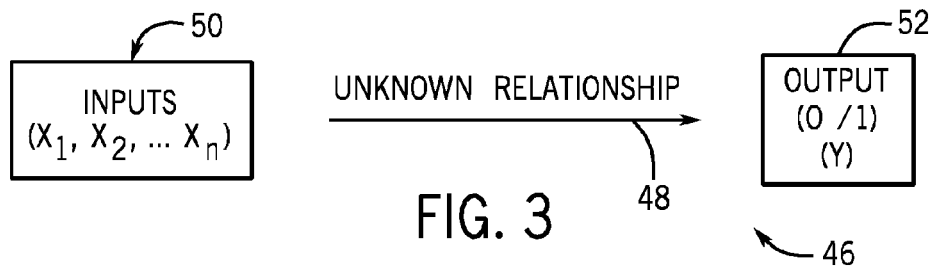
FIG. 3 is a is a schematic diagram of the basis for a technique for developing a propensity model of an event, in accordance with an exemplary embodiment of the present technique.

Referring generally to FIG. 3, a schematic diagram of the basis for developing a propensity model is presented, and represented generally by reference numeral 46. The development of the propensity model is based on identifying an unknown relationship 48 between various inputs 50 and outputs 52. In this example, the inputs 50 are the various customer characteristics and the outputs 52 are the customer's response to a past offer, either accepting or declining the offer. Once the unknown relationship 48 is established, a model of the propensity of an event to occur in the future may be established. In reference to FIG. 2, propensity modeling tries to find a relationship between the "X's" and the "y", i.e., a relationship between the customer characteristics and the customer's response to a previous situation. More specifically, the objective is to find a function, "f", which maps the "X's" to the "y". The resulting function, "f", is the propensity model. For these purposes, it is assumed that the function, "f", is a linear function of "X". The propensity model for "n" customer characteristics can be represented as:

$$f(X) = \beta_0 + \beta_1 \cdot X_1 + \beta_2 \cdot X_2 + \ldots + \beta_n \cdot X_n, y \in \{0,1\} \quad (1)$$

The greater the relative value of f(X), the greater the propensity of the event to occur. In this embodiment, the closer the value of f(X) to one, as opposed to zero, the greater the propensity of the event to occur. The objective of propensity modeling is to find an optimal set of "β's" so that the function, "f", gives a "good" map of the relationship between the "X's" and the "y", i.e., the relationship between the customer characteristics and the customer's response to past situations. The propensity modeling becomes very difficult when the rate of a particular response, i.e., an event, is very low. A low event rate means that the number of responses of interest, i.e., with "y"=1, is very few as compared to the population size (it may be less than 1% of the entire population). In this case, the objective of propensity modeling is to estimate the values of "β's" such that those very few "1's" are captured properly.

Figure 4:
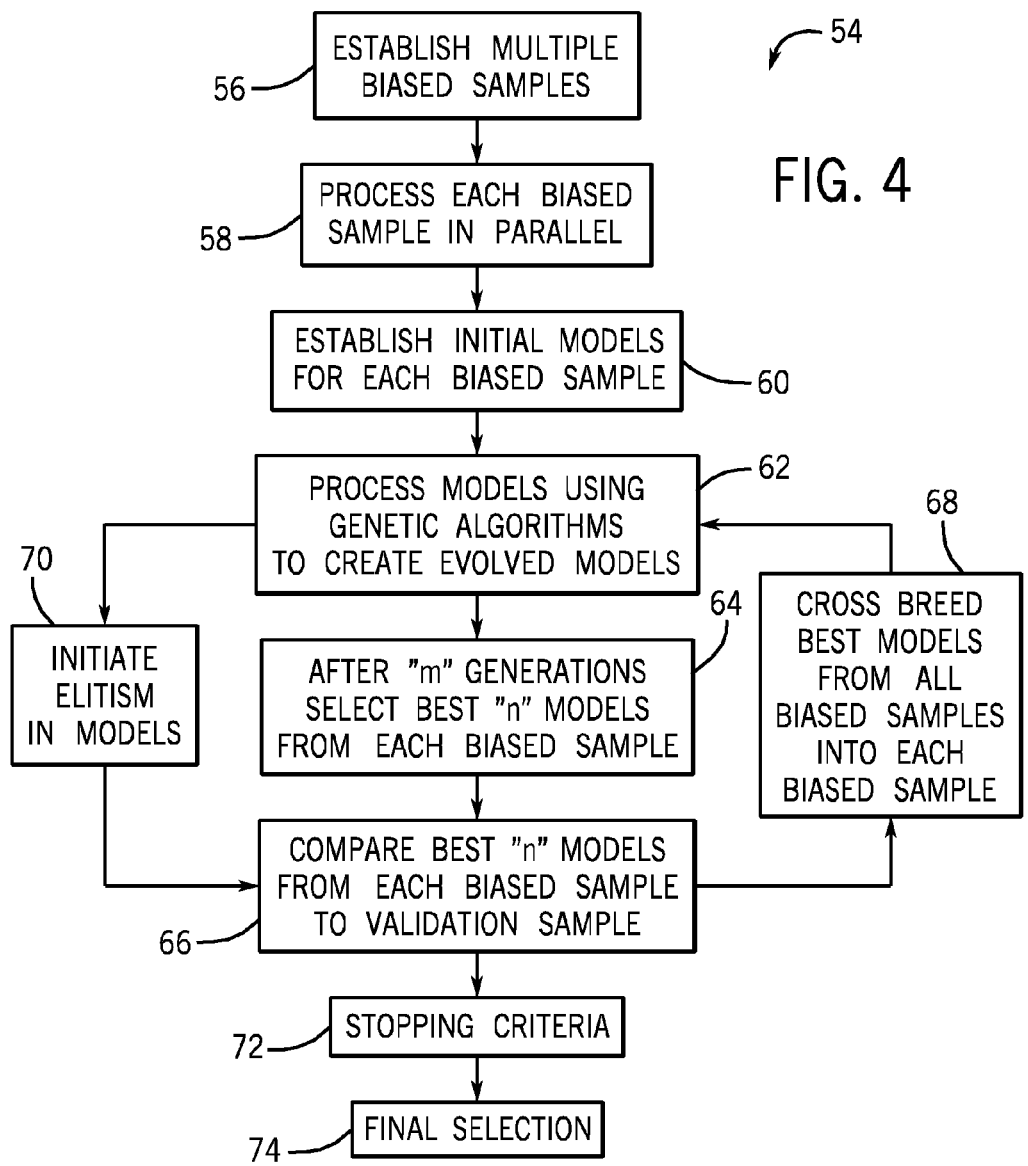
FIG. 4 is a block diagram of a technique for developing a propensity model of an event, in accordance with an exemplary embodiment of the present technique.

Referring generally to FIG. 4, a block diagram of a technique for developing a propensity model for low event rate data is presented, and represented generally by reference numeral 54. However, the technique may be used to develop propensity models for events with greater rates. As will be discussed in more detail below, the technique utilizes genetic algorithms to build independent propensity models using multiple biased sample sets of customer data as a training population.

In the illustrated embodiment of the technique, multiple biased samples of customer data are established, represented generally by block 56. In this embodiment, each of these biased samples has all the data points representing the event, i.e., all of the customer data for the customers having a response, "y", equal to "1", and a subset of the customer data for the customers having the response, "y", equal to "0". As a result, each biased sample of customer data has a much higher event rate than the actual customer data. In this embodiment of the technique, each of the biased samples of customer data is processed independently, as represented generally by reference numeral 58. Independent processors may be used to process each biased sample of customer data. Each processor and process evolves a sub-population of propensity models based on their respective biased samples. This recreates an aspect of evolution known as the "island" effect.

At least one initial propensity model for each of the biased customer data samples is established, as represented generally by block 60. However, a plurality of initial propensity models may be established for each of the biased samples. The propensity models utilized in this embodiment are linear functions of the customer characteristics. The initial values for the "β's" used in the function may be selected at random or from examples of "good" models developed previously.

The propensity models are processed by the various processors using genetic algorithms to evolve the initial propensity models into better models for their respective biased samples, as represented generally by block 62. The genetic algorithms utilize techniques that mimic evolution to change the "β's" of the propensity models. In effect, the propensity models represent chromosomes. The changes that can occur to chromosomes during evolution and reproduction are replicated in the propensity models by the genetic algorithms. For example, the genetic algorithms may initiate random mutations in the values for the "β's" in the models or the genetic algorithm may initiate crossovers of "β's" between propensity models, as occurs in nature during meiosis in eukaryotic cells. If only one initial propensity model is established for a biased sample, the process of mutation may be used to create a second propensity model. The genetic algorithm may then initiate cross-over between the initial propensity model and the propensity model produced by mutation to produce a third propensity model.

Each change in the propensity model represents a generation of the propensity model. In this embodiment, the processors use the genetic algorithms to continue evolving the propensity models for a select number of generations. After the select number of generations, the process is paused. Alternatively, the accuracy of the propensity models may be checked against their biased samples after each generation. When there is no significant improvement of the propensity models from generation to generation, the process may be paused.

The propensity models that best fit their respective biased samples are selected from among each biased sample, as represented generally by block 64. A data fitting program may be used to check the accuracy of the propensity models against their biased samples. In this embodiment, the best fit propensity models are selected after a specified number of generations of evolution have occurred. However, other criteria may be used to select the propensity models that best fit their respective based samples.

The propensity models with the best fit to their respective biased samples are compared to a validation sample to identify the best fit propensity models that are also the best fit for the validation sample, as represented generally by block 66. As above, a data fitting program may be used to check the accuracy of the propensity models to the validation sample. In this embodiment of the technique, the validation sample is a smaller sample size than the original customer data, but has the same event rate as the original customer data. However, the original sample of customer data may be used, as well. In this embodiment, the validation sample is maintained on a central processor and not on the independent processors used to process the propensity models for each of the biased samples.

The propensity models that best fit the validation sample are then crossbred into the propensity models for the multiple biased samples, as represented generally by block 68. A specified number of propensity models that best fit the validation sample are selected from among all of the propensity models that were selected as best fitting their respective biased samples. In this embodiment of the technique, the worst propensity models for each biased sample are then replaced by the propensity models that best fit the validation sample.

The propensity models are then evolved using the genetic algorithms as described above in reference to block 62. However, after the first cross-breeding step, an elitism technique is introduced for each biased sample, as represented generally by block 70. Elitism means that the best fit propensity models for each biased sample are maintained across generations. However, in this embodiment, the propensity models that best fit the validation sample that are re-seeded into each process are also maintained as elite propensity models. This ensures that the individual propensity models that are considered for the best fit for a given biased sample include those propensity models that have good generalization abilities, as reflected by their fitness to the validation sample. By using the propensity models that best fit the validation sample to generate new propensity models (through cross-over and mutation), the characteristics that lead to good generalization are maintained across generations.

As above, the propensity models that best fit their respective biased samples are selected from among each biased sample, as described above in reference to block 64. Similarly, the propensity models with the best fit to their respective biased samples are compared to the validation sample to identify the propensity models that best fit the validation sample once again, as described above in reference to block 66. Also, once again, the propensity models that best fit the validation sample are crossbred into the propensity models for the multiple biased samples, as described above in reference to block 68. Similarly, a new set of propensity models to be maintained as elite propensity models is established after the validation checks are made as described above in reference to block 70.

The process described above continues until a specified stopping criterion is reached, as represented by block 72. The stopping criterion may be the passage of a specified number of generations. Alternatively, the stopping criteria may be that improvement in the propensity models in comparison to the validation sample is not improving markedly. However, the stopping criteria may be based on any desired factor.

A final selection of a propensity model may be made from among the remaining propensity models, if there is more than one remaining, as represented by block 74. In the illustrated embodiment, the final selection is based on a comparison with the validation sample. The propensity model having the best fit to the validation sample is selected as the final propensity model.

Figure 5A:
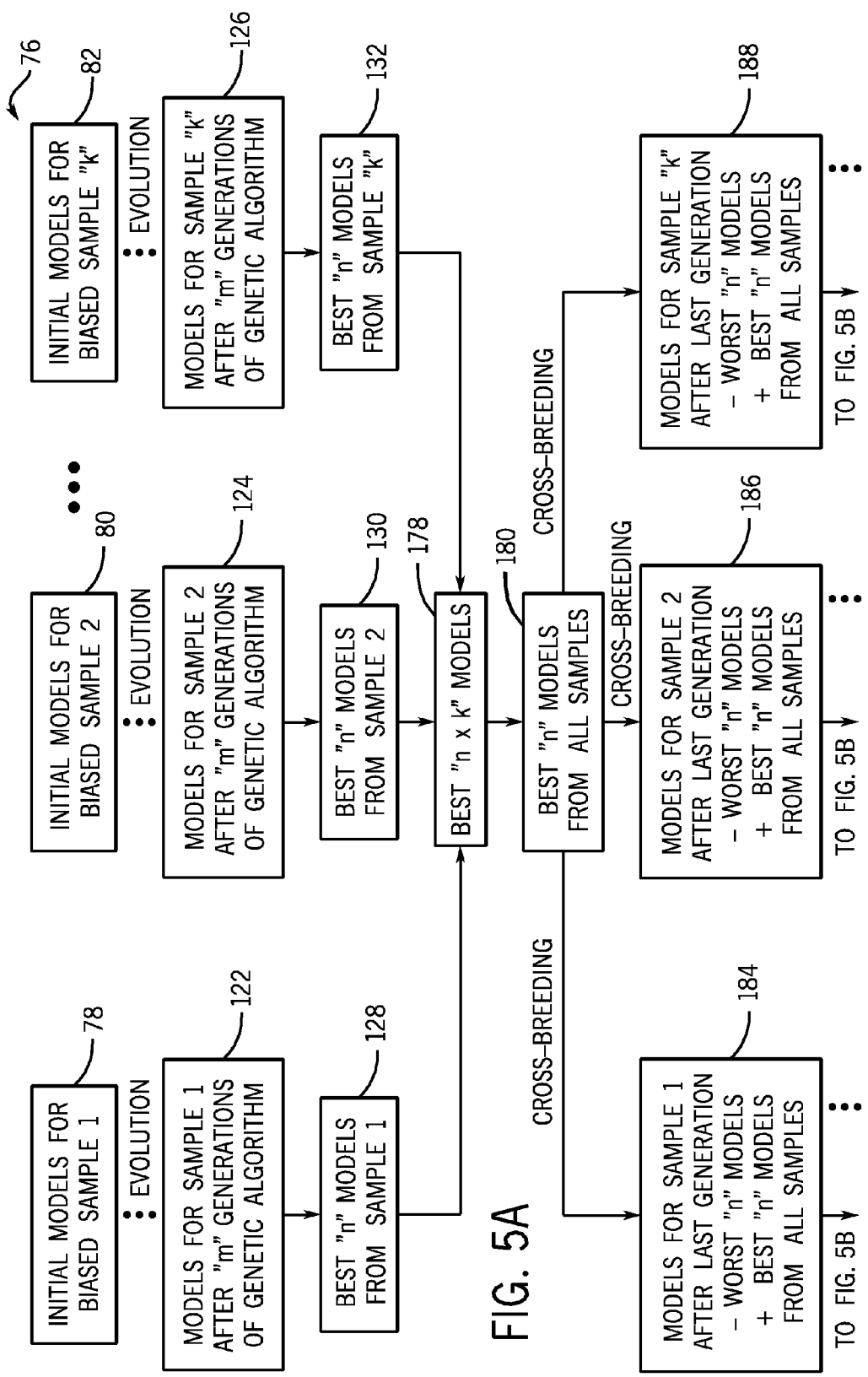
FIGS. 5A and 5B are a block diagram of the evolution of propensity models utilizing the technique of FIG. 4, in accordance with an exemplary embodiment of the present technique.

Referring generally to FIG. 5, the evolution of the propensity models from an initial selection to a final selection in accordance with the techniques of FIG. 4 is presented, and represented generally by reference numeral 76. In the illustrated embodiment, there are "k" biased samples created. Initial propensity models are established for each of the "k" biased samples. The initial propensity models established for the first biased sample are represented generally by reference numeral 78. The initial propensity models established for the second biased sample are represented generally by reference numeral 80. The initial propensity models established for biased sample "k" are represented generally by reference numeral 82.

Figure 6:
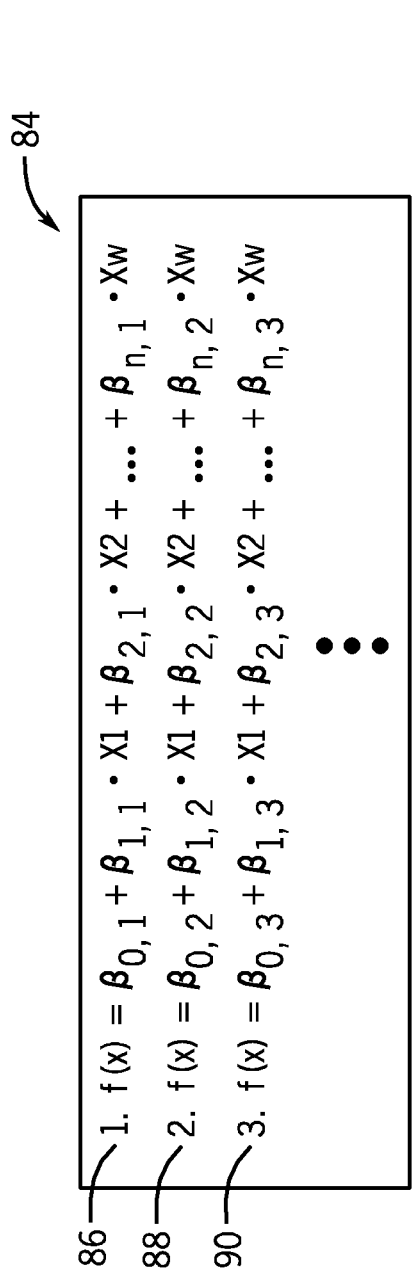
FIG. 6 is an embodiment of an initial set of propensity models for a biased sample, in accordance with an exemplary embodiment of the present technique.

Referring generally to FIG. 6, an embodiment of initial propensity models for the first biased sample are presented, and represented generally by reference numeral 84. In this embodiment, a first initial propensity model 86, a second propensity model 88, and a third propensity model 90 are presented, but a greater or lesser number of propensity models may be used. As noted above, the initial values for the various $\beta$ variables in the propensity models may be selected at random or based on some other scheme, such as selecting values obtained from previous or similar propensity modeling. The subscripts of the various $\beta$ variables are labeled in FIG. 6 to indicate the specific $\beta$ variable, $\beta_0$, $\beta_1$, $\beta_2$, etc., and the specific propensity model to which it belongs, first, second, third, etc. The first subscript refers to the specific $\beta$ variable and the second subscript refers to the propensity model. For example, $\beta_{0,1}$ refers to the $\beta_0$ value in the first propensity model 86. Similarly, $\beta_{1,2}$ refers to the $\beta_1$ value for the second propensity model.

Figure 7:
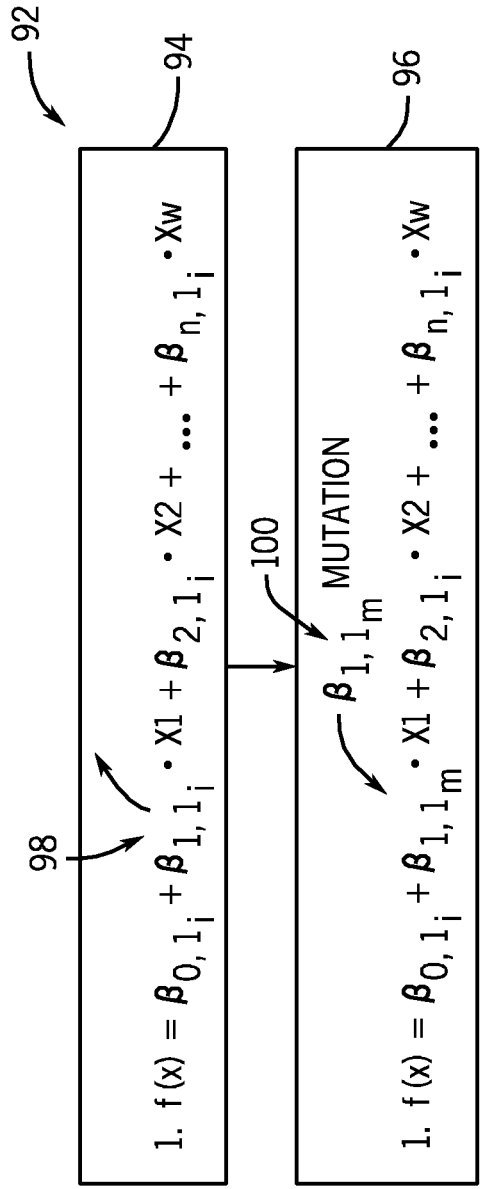
FIG. 7 is an embodiment of a propensity model experiencing mutation, in accordance with an exemplary embodiment of the present technique.

Referring generally to FIG. 7, an embodiment of the process of mutation in a propensity model is presented. In FIG. 7, a propensity model before mutation and a propensity model after mutation are presented, and represented generally by reference numeral 92. In this embodiment, a first propensity model 94 undergoes mutation to a second propensity model 96. More specifically, in the illustrated embodiment, the value for $\beta_{1,1}$ in the first propensity model 94 mutates from an initial value, $\beta_{1,1i}$, represented generally by reference numeral 98, to a mutated value, $\beta_{1,1m}$, represented generally by reference numeral 100, in the second propensity model 96.

Figure 8:
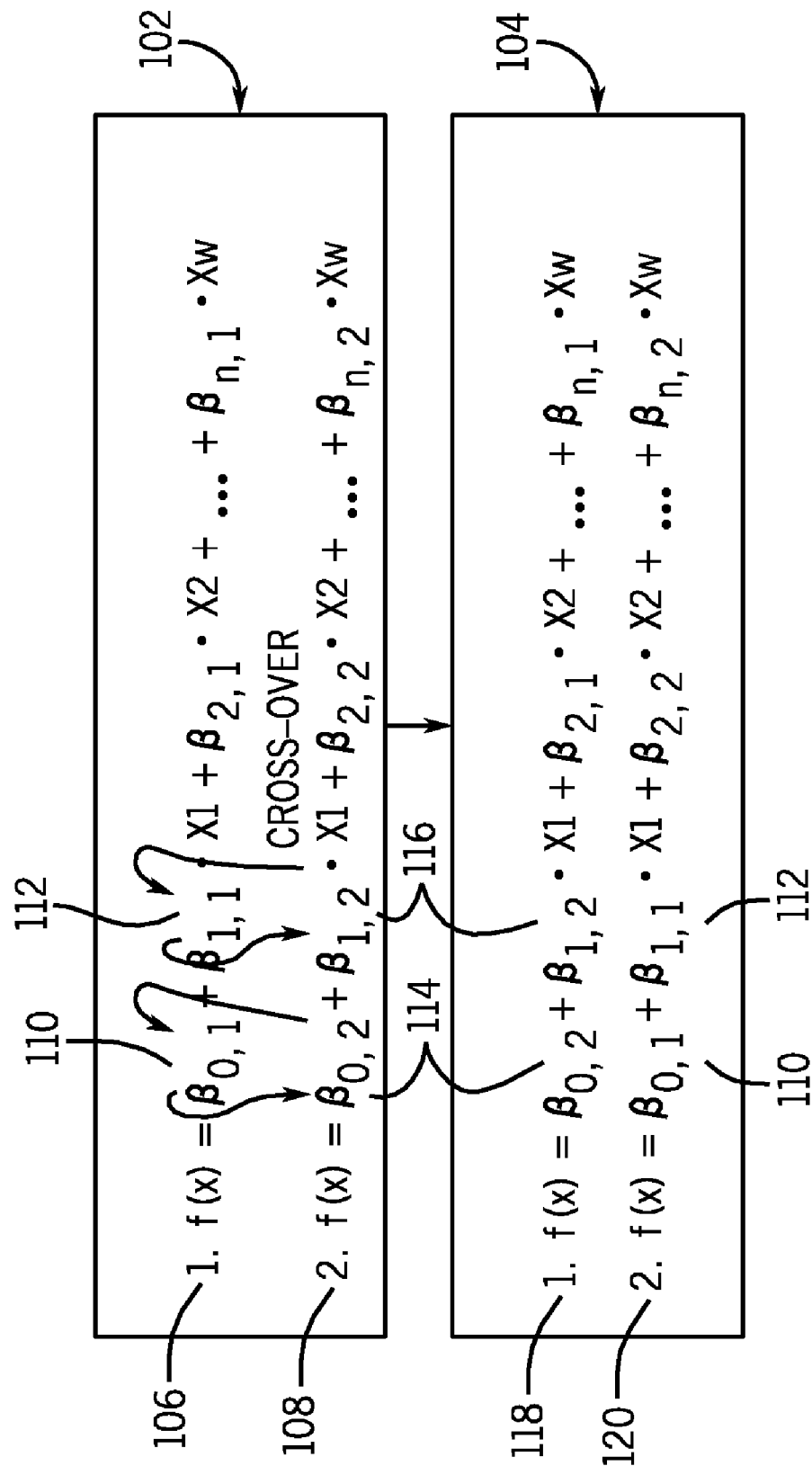
FIG. 8 is an embodiment of a pair of propensity models undergoing cross-over, in accordance with an exemplary embodiment of the present technique.

Referring generally to FIG. 8, an embodiment of the process of cross-over between propensity models also is presented. Cross-over is the process whereby a new propensity model is created from two or more parent propensity models. A pair of propensity models before cross-over, represented generally by reference numeral 102, and the same pair of propensity models after cross-over, represented generally by reference numeral 104, are presented. In this embodiment of cross-over, the values for one or more $\beta$ variables from one propensity model are swapped with the values for one or more $\beta$ variables of another propensity model. In the illustrated embodiment, the $\beta_0$ and $\beta_1$ values in a first propensity model 106 are swapped with the $\beta_0$ and $\beta_1$ values of a second propensity model 108. Specifically, $\beta_{0,1}$, represented generally by reference numeral 110, and $\beta_{1,1}$, represented generally by reference numeral 112, of the first propensity model 106 are swapped with $\beta_{0,2}$, represented generally by reference numeral 114, and $\beta_{1,2}$, represented generally by reference numeral 116, of the second propensity model 108. Consequently, the first propensity model in the next generation, represented generally by reference numeral 118, and the second propensity model in the next generation, represented generally by reference numeral 120, have new values for $\beta_0$ and $\beta_1$. However, other types of cross-over may be used. For example, instead of swapping values of one or more $\beta$ variables between different propensity models, the values of $\beta$ variables in different propensity models may be averaged.

Referring again to FIG. 5A, after a selected number, "m", of generations of processing, each of the initial propensity models in each biased sample has evolved to a new propensity model. The initial propensity models established for the first biased sample have evolved to evolved propensity models, represented generally by reference numeral 122. The initial propensity models established for the second biased sample have also evolved to evolved propensity models, represented generally by reference numeral 124. The initial propensity models for the remaining biased samples have also evolved, including the propensity models established for biased sample "k", represented generally by reference numeral 126.

A select number, "n", of the propensity models that best fit each of their respective biased samples are selected for comparison to the validation sample. The "n" propensity models that best fit the first biased sample are selected for comparison, represented generally by reference numeral 128. As are the "n" propensity models that best fit the second biased sample, represented generally by reference numeral 130. The propensity models that best fit each of the remaining biased samples are also selected, including the "n" propensity models that best fit biased sample "k", represented generally by reference numeral 132.

Figure 9:
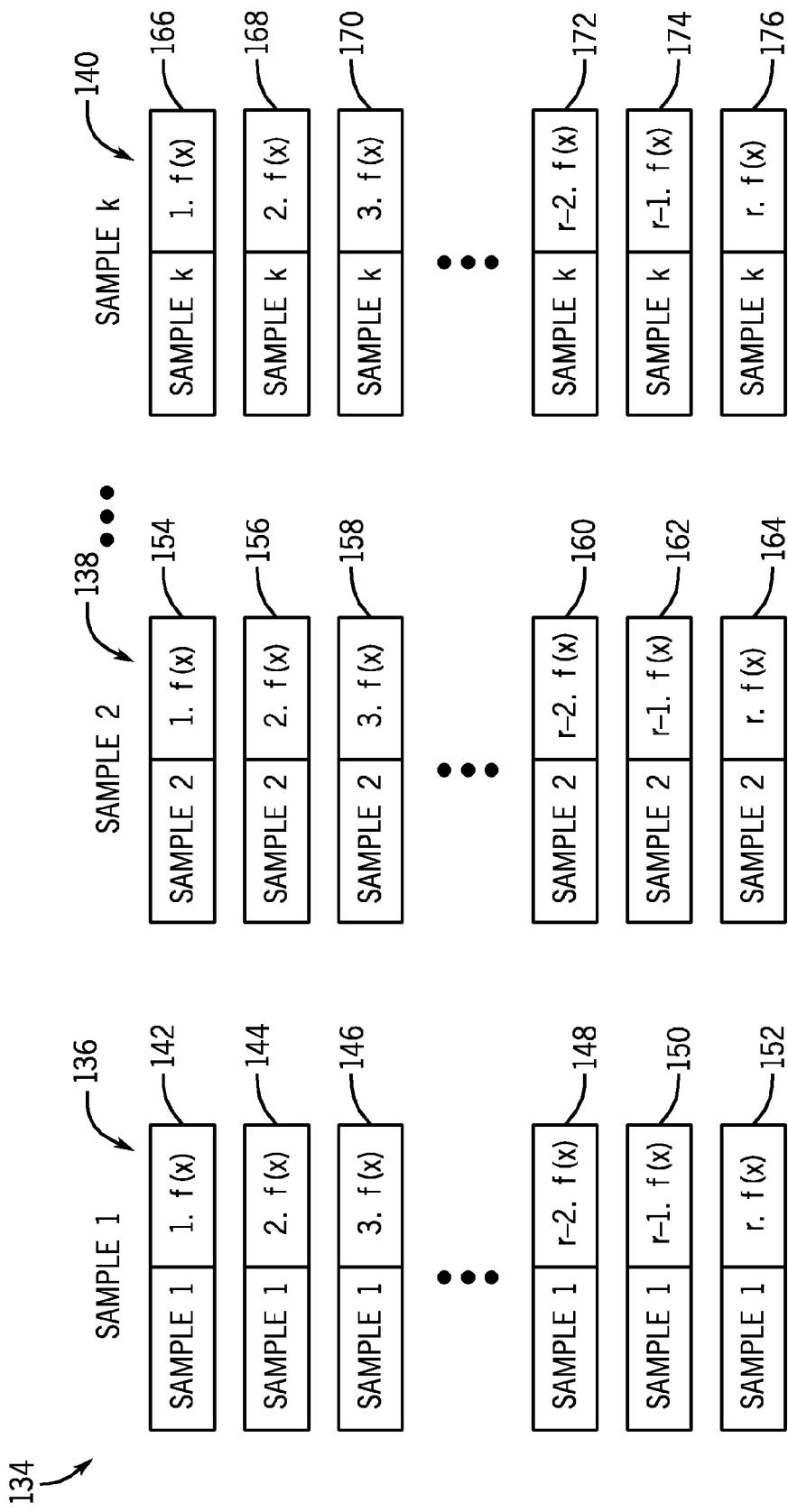
FIG. 9 is an embodiment of propensity models for a series of biased samples after "m" generations, ranked from best to worst, in accordance with an exemplary embodiment of the present technique.

Referring generally to FIG. 9, an embodiment of propensity models for the biased samples ranked by their fit to their respective biased samples are presented, and represented generally by reference numeral 134. The propensity models corresponding to the first biased sample are represented generally by reference numeral 136. The propensity models corresponding to the second biased sample are represented generally by reference numeral 138. The propensity models corresponding to biased sample "k" are represented generally by reference numeral 140. In this embodiment, "n" corresponds to three. The three propensity models that fit the first biased sample the best are represented generally by reference numerals 142, 144, and 146, respectively. The three propensity models that fit the first biased sample the worst are represented generally by reference numerals 148, 150, and 152, respectively. Similarly, the three propensity models that fit the second biased sample the best are represented generally by reference numerals 154, 156, and 158, respectively. The three propensity models that fit the second biased sample the worst are represented generally by reference numerals 160, 162, and 164, respectively. Finally, the three propensity models that fit biased sample "k" the best are represented generally by reference numerals 166, 168, and 170, respectively. The three propensity models that fit biased sample "k" the worst are represented generally by reference numerals 172, 174, and 176, respectively.

Referring again to FIG. 5A, a total of "n×k" propensity models are selected for comparison against the validation sample, represented generally by reference numeral 178. In this embodiment, that means a total of "3×k" propensity models are selected for comparison against a validation sample. A specified number, "n" of the propensity models that best fit the validation sample are selected from the "n×k" propensity models, represented generally by reference numeral 180. In this embodiment, "n" refers to three. Thus, the three propensity models that best fit the validation sample are selected.

Figure 10:
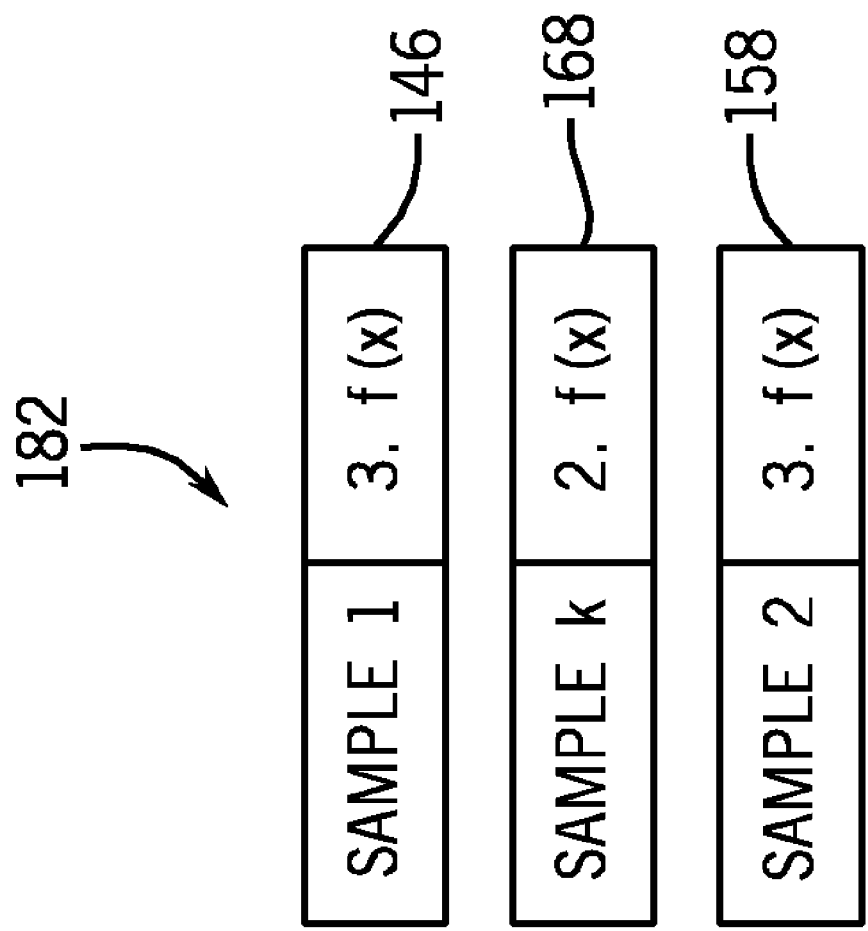
FIG. 10 is an embodiment of the three best propensity models from the "n×k" best propensity models, in accordance with an exemplary embodiment of the present technique.

Referring generally to FIG. 10, the three propensity models that best fit the validation sample are presented, and represented generally by reference numeral 182. In this embodiment, the propensity model that best fit the validation sample was a propensity model that had been modeled against the first biased sample and was the third best propensity model 146 for the first biased sample. In addition, the second best propensity model against the validation sample in this embodiment was the propensity model that was the second best propensity model 168 for biased sample "k". Finally, the third best propensity model against the validation sample was the propensity model that was the third best propensity model 158 against the second biased sample.

Referring again to FIG. 5A, the "n" propensity models that best fit the validation sample are cross-bred with the propensity models used for each of the parallel processes to develop models for each biased sample. These "n" select propensity models replace the "n" propensity models that fit each biased sample the worst. As noted above, in the illustrated embodiment, "n" is equal to three. Thus, for each biased sample, the three propensity models that fit the biased sample the worst are replaced by the three propensity models that best fit the validation sample.

The propensity models for the first biased sample after cross-breeding, represented generally by reference numeral 184, comprise the "n" propensity models that best fit the first biased sample prior to cross-breeding, the "n" best propensity models for all biased samples that best fit the validation sample, and the remaining propensity models from before cross-breeding minus the "n" propensity models that fit the first biased sample the worst, which were replaced by the "n" best propensity models for all biased samples that best fit the validation sample. Similarly, each set of propensity models for the remaining biased samples comprise the same formula of propensity models. The propensity models for the second biased sample after cross-breeding, represented generally by reference numeral 186, comprise the "n" propensity models that best fit the second biased sample prior to cross-breeding, the "n" best propensity models for all biased samples that best fit the validation sample, and the remaining propensity models from before cross-breeding minus the "n" propensity models that fit the second biased sample the worst, which were replaced by the "n" best propensity models for all biased samples that best fit the validation sample. Similarly, each set of propensity models for the remaining biased samples comprise the same formula of propensity models. The propensity models for biased sample "k" after cross-breeding, represented generally by reference numeral 188, comprise the "n" propensity models that best fit biased sample "k" prior to cross-breeding, the "n" best propensity models for all biased samples that best fit the validation sample, and the remaining propensity models from before cross-breeding minus the "n" propensity models that fit biased sample "k" the worst, which were replaced by the "n" best propensity models for all biased samples that best fit the validation sample.

Figure 11:
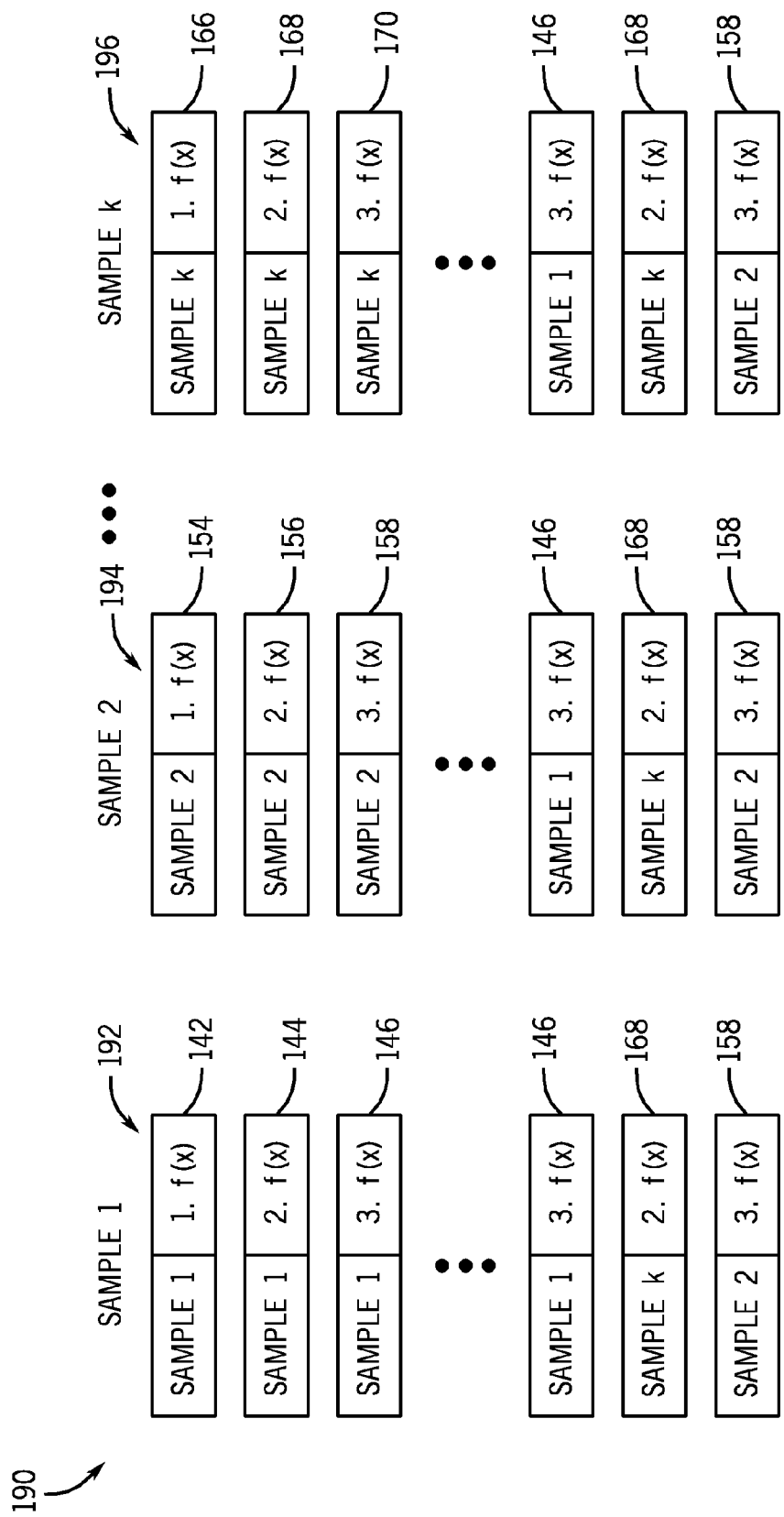
FIG. 11 is an embodiment of the propensity models for each biased sample after the three worst propensity models are replaced by the three best propensity models from the "n×k" best propensity models, in accordance with an exemplary embodiment of the present technique.

Referring generally to FIG. 11, an embodiment of the propensity models after cross-breeding are presented, and represented generally by reference numeral 190. In this embodiment, each of the three propensity models that fit their respective biased samples the worst have been replaced by the three propensity models that best fit the validation sample. For the propensity models for the first biased sample after cross-breeding, represented generally by reference numeral 192, the three propensity models that fit the first biased sample the worst, propensity models 148, 150, and 152 from FIG. 9, have been replaced by propensity models 146, 168, and 158. For the propensity models for the second biased sample after cross-breeding, represented generally by reference numeral 194, the three propensity models that fit the second biased sample the worst, propensity models 160, 162, and 164 from FIG. 9, have also been replaced by propensity models 146, 168, and 158. The propensity models for the remaining biased samples are similarly affected. For the propensity models for biased sample "k" after cross-breeding, represented generally by reference numeral 196, the three propensity models that fit biased sample "k" the worst, propensity models 172, 174, and 176 from FIG. 9, have also been replaced by propensity models 146, 168, and 158.

Figure 5B:
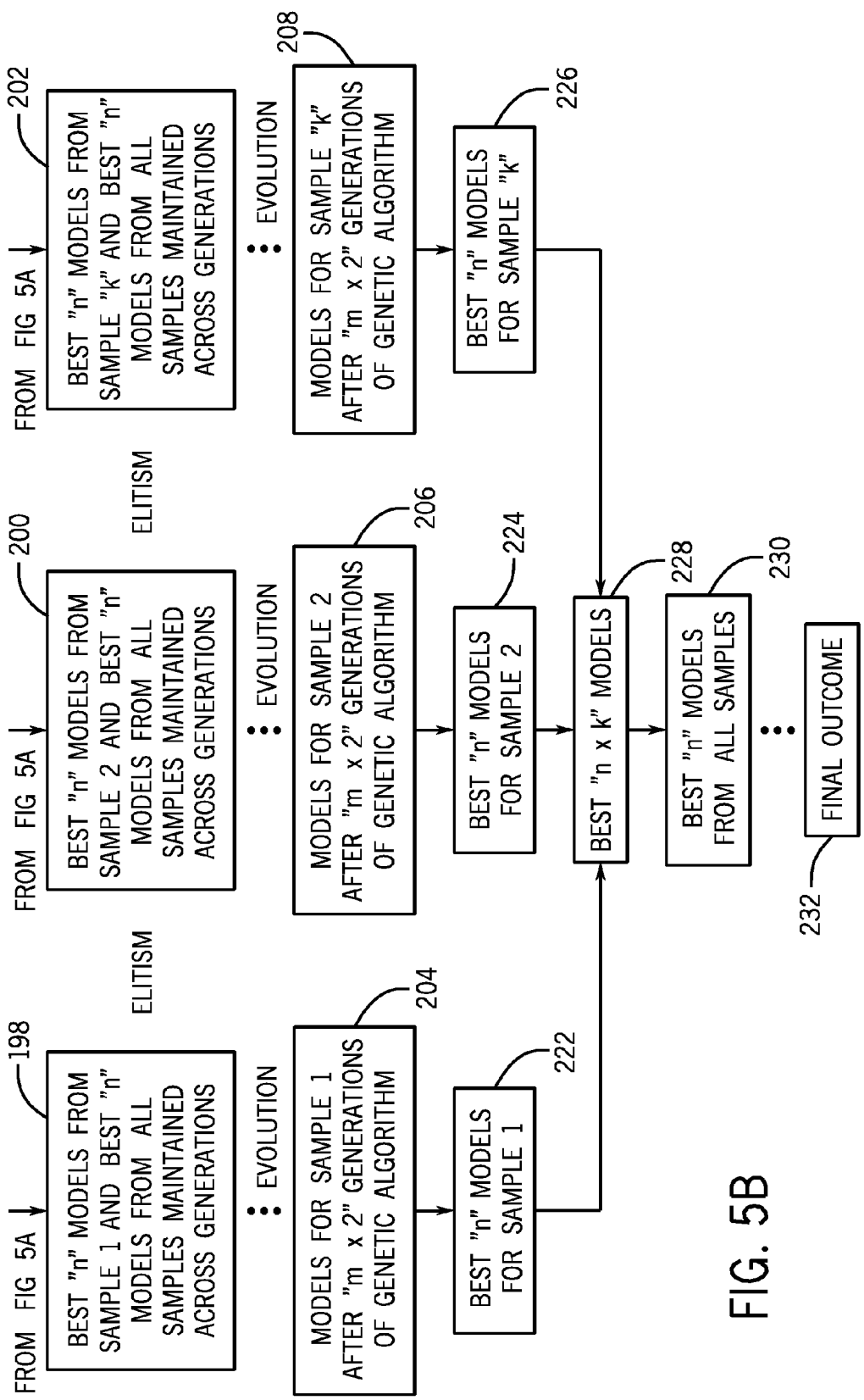

Referring generally to FIG. 5B, as noted above, after the first cross-breeding of propensity models among the sets of propensity models for the multiple biased samples, an elitism process is introduced into the genetic algorithms. In this embodiment, the "n" propensity models identified as the propensity models that best fit each biased sample and the "n" propensity models that best fit the validation sample, from among the propensity models that best fit each biased sample, are maintained from generation to generation, i.e., they are not evolved by the genetic algorithm. However, these elite propensity models may be used to evolve other propensity models for each biased sample. For the first biased sample, the "n" propensity models that were found to best fit the first biased sample after the "m" generation and the "n" propensity models for all biased samples that best fit the validation sample are elite propensity models, and represented generally by reference numeral 198. These elite propensity models are maintained across generations as the genetic algorithm processes the propensity models for the first biased sample. For the second biased sample, the "n" propensity models that were found to best fit the second biased sample after the "m" generation and the "n" propensity models for all biased samples that best fit the validation sample are elite propensity models that are maintained across generations, and represented generally by reference numeral 200. In addition, the elite propensity models for the remaining biased samples are treated accordingly. Consequently, the "n" propensity models that were found to best fit biased sample "k" after the "m" generation and the "n" propensity models for all biased samples that best fit the validation sample are treated as elite propensity models that are maintained across generations, and represented generally by reference numeral 202.

However, the remaining propensity models for each biased sample are evolved by the processors using the genetic algorithms. Processing the propensity models with genetic algorithms includes utilizing the elite propensity models. For example, portions of the elite propensity models may crossover into other propensity models. The genetic algorithm operates as before to evolve the non-elite propensity models for another "m" generations, for a total of "m×2" generations of evolution. The propensity models for the first biased sample after a select number of generations, represented generally by reference numeral 204, comprise the elite propensity models for the first biased sample and non-elite propensity models for the first biased sample that have evolved over the select number of generations. The propensity models for the second biased sample after a select number of generations, represented generally by reference numeral 206, comprise the elite propensity models for the second biased sample and non-elite propensity models for the second biased sample that have evolved over the select number of generations. Similarly, the propensity models for each of the remaining biased sample comprise elite propensity models for the respective biased sample and non-elite propensity models for the biased sample that have evolved over the select number of generations. Thus, the propensity models for biased sample "k" after a select number of generations, represented generally by reference numeral 208, comprise the elite propensity models for biased sample "k" and non-elite propensity models for biased sample "k" that have evolved over the select number of generations.

Figure 12:
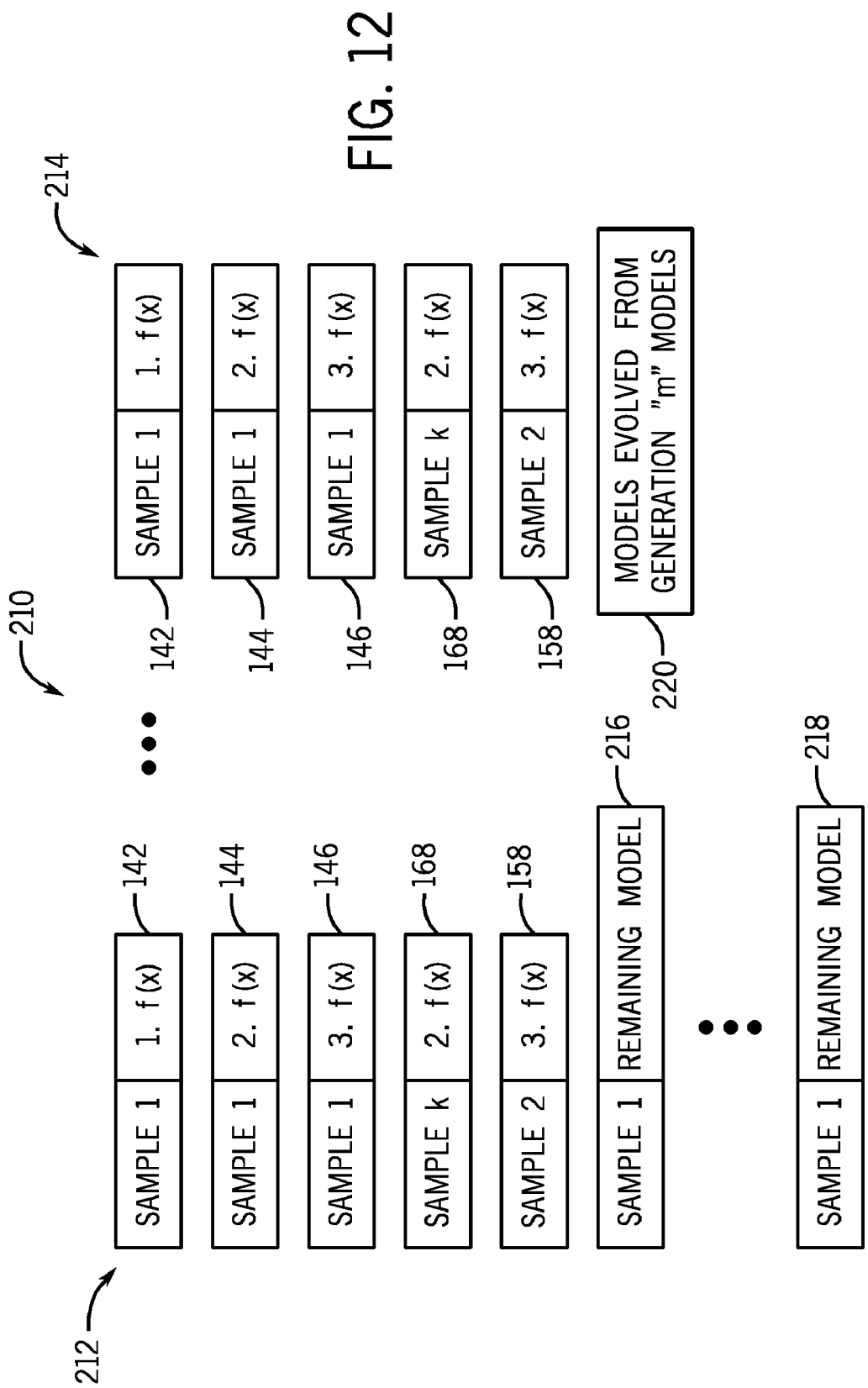
FIG. 12 is a block diagram of elitism for desired propensity models between generations of evolution for a series of propensity models, in accordance with an exemplary embodiment of the present technique.

Referring generally to FIG. 12, an embodiment of the evolution of the propensity models for the first biased sample for a select number of generations after the first cross-breeding step is presented, and represented generally by reference numeral 210. In the illustrated embodiment, two sets of propensity models are presented. A first set of propensity models, represented generally by reference numeral 212, comprise the propensity models for the first biased sample just after the first biased sample has been crossbred. A second set of propensity models, represented generally by reference numeral 214, comprise the propensity models for the first biased sample after the propensity models have evolved due to the genetic algorithm for a select number of generations.

The first set of propensity models 212 for the first biased sample just after the first biased sample has been crossbred comprise the elite propensity models, represented by propensity models 142, 144, 146, 148, 158, and 168, respectively. In addition, the first set of propensity models 212 also comprise the remaining propensity models that will be evolved by the genetic algorithm, represented generally by reference numerals 216 and 218. The second set of propensity models 214 comprise the elite propensity models for the first biased sample and a series of propensity models 220 that have evolved from the first set of propensity models 212 due to genetic algorithms.

Referring again to FIG. 5B, as before, after the propensity models have evolved for a second selected number of generations, a specified number "n" of propensity models that best fit their respective biased samples are selected from the propensity models for each biased sample for comparison to the validation sample. The "n" number of propensity models that best fit the first biased sample are selected from the set of propensity models for the first biased sample, and represented generally by reference numeral 222. In addition, the same number of propensity models that best fit the second biased sample are selected from the set of propensity models for the second biased sample, and represented generally by reference numeral 224. This process continues for each set of propensity models for each biased sample. Thus, the select number of propensity models that best fit biased sample "k" are also selected from the set of propensity models for biased sample "k", and represented generally by reference numeral 226.

The best "n×k" propensity models selected from the sets of propensity models after the second series of processing by the genetic algorithm are then compared to the validation sample, represented generally by reference numeral 228. Once again, a specified number, "n", of the propensity models that best fit the validation sample are selected, and represented generally by reference numeral 230. These propensity models 230 are then cross-bred back into the propensity models for each of the biased samples. This process continues until a specified stopping criterion is reached, such as the passing of a specified number of generations of evolution.

In this embodiment, the final outcome of the process is the propensity model that best fits the validation sample when the stopping criterion is reached, represented generally by reference numeral 232.

Referring generally to FIG. 13, an embodiment of a final propensity model is presented, and represented generally by reference numeral 234. The values for the various "β's" of the final propensity model having been established by the techniques described above. The propensity of a customer to respond to an event may be estimated using the final propensity model 234 and the characteristics of a customer, "$X_1$-$X_W$". The greater the value of f(X), the greater the propensity of the event to occur. In this embodiment, the product of the final propensity model is a number between zero and one, inclusive, that is an estimation of the propensity of the event to occur. If the product is zero, the event is unlikely to respond. If the number is one, the event is very likely to occur. However, in other propensity models the range of values may differ.

The above processes and techniques may be implemented on a computer-based system. The computer based-system may include one or more of the processors described above, a memory, and a machine or computer-readable medium. The one or more processors are configured to implement the processes and techniques described above. The memory is coupled to the one or more processors. The memory may store programs (e.g., code), data (e.g., databases described above), and/or algorithms (e.g., genetic algorithm described above) to implement the above processes or techniques. In addition, the programs, data, and/or algorithms to implement the above processes and techniques may be stored on one or more tangible, non-transitory computer readable media and provided to the memory and/or the one or more processors. Examples of computer readable media include, but are not limited to, compact discs, optical discs (e.g., DVD discs), non-volatile memory devices, and USB devices.

The technical effect of the technique is to develop a propensity model to describe the propensity of a customer, or customers, to respond to an event in a particular manner. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer-implemented method of developing a propensity model for an event, comprising:
   establishing a plurality of biased samples of data representative of a previous event, wherein each of the plurality of biased samples of data representative of a previous event is biased differently;
   establishing at least one propensity model for each biased sample of data;
   processing each of the at least one propensity model with a genetic algorithm;
   checking fitness of at least one propensity model for each biased sample against a validation sample of data, wherein the validation sample of data is unbiased; and
   identifying a first propensity model for a first biased sample of data for cross-breeding with a second propensity model for a second biased sample based on fitness of the first propensity model to the validation sample of data.

2. The computer-implemented method of developing a propensity model as recited in claim 1, comprising:
   cross-breeding the first propensity model and the second propensity model with the genetic algorithm to establish a third propensity model.

3. The computer-implemented method of developing a propensity model as recited in claim 2, wherein crossbreeding the first propensity model and the second propensity model with a genetic algorithm to establish a third propensity model comprises combining a portion of the first propensity model with a portion of the second propensity model to create a third propensity model.

4. The computer-implemented method of developing a propensity model as recited in claim 2, wherein crossbreeding the first propensity model and the second propensity model with a genetic algorithm to establish a third propensity model comprises averaging a variable of the first propensity model with a corresponding variable in the second propensity model.

5. The computer-implemented method of developing a propensity model as recited in claim 2, comprising processing the second propensity model with the genetic algorithm after cross-breeding the second propensity model with the first propensity model.

6. The computer-implemented method of developing a propensity model as recited in claim 2, wherein a copy of the first propensity model is associated with the second biased sample of data and not evolved by the genetic algorithm.

7. The computer-implemented method of developing a propensity model as recited in claim 1, wherein identifying a first propensity model based on fitness of the first propensity model to a validation sample of data comprises:

checking fitness of each propensity model to its biased sample of data;

identifying at least one propensity model for each biased sample of data to check for fitness to the validation sample of data based on fitness of each propensity model to its biased sample of data; and checking each of the at least one propensity model for each biased sample for fitness to the validation sample of data.

8. The computer-implemented method of developing a propensity model as recited in claim 7, wherein identifying a first propensity model comprises identifying as the first propensity model the propensity model that best fits the validation sample of data from among the at least one propensity model for each biased sample of data.

9. The computer-implemented method of developing a propensity model as recited in claim 7, comprising:

storing a copy of each propensity model that best fits each of the biased samples of data and not evolving the copy with the genetic algorithm; and processing each other propensity model of each biased sample of data with the genetic algorithm.

10. The computer-implemented method of developing a propensity model as recited in claim 1, wherein processing each propensity model established for each biased sample of data with a genetic algorithm comprises processing a propensity model corresponding to a first biased sample with the genetic algorithm independently of processing a propensity model corresponding to a second biased sample with the genetic algorithm.

11. The computer-implemented method of developing a propensity model as recited in claim 1, wherein the data comprises data representative of each entity of a plurality of entities and a previous result corresponding to each entity of the plurality of entities.

12. The computer-implemented method of developing a propensity model as recited in claim 11, wherein each biased sample of data comprises the data representative of each entity of the plurality of entities having a specific previous result.

13. The computer-implemented method of developing a propensity model as recited in claim 12, wherein each biased sample of data comprises the data representative of different limited sets of entities of the plurality of entities having a result different from the specific previous result.

14. A non-transitory machine-readable medium for developing a propensity model, comprising:

code operable to establish a plurality of biased samples of data representative of a previous event, wherein each of the plurality of biased samples of data representative of a previous event is biased differently;

code operable to establish a propensity model for each biased sample of data;

code operable to process each propensity model with a genetic algorithm;

code operable to check fitness of at least one propensity model for each biased sample against a validation sample of data, wherein the validation sample of data is unbiased; and code operable to identify a first propensity model for a first biased sample of data for cross-breeding with a second propensity model for a second biased sample based on fitness of the first propensity model to the validation sample of data.

15. A computer-implemented method of developing a propensity model for an event, comprising:

establishing a plurality of biased samples of data;

establishing a plurality of propensity models that correspond to each of the plurality of biased samples of data;

processing each of the plurality of propensity models that correspond to each of the plurality of biased samples of data with a genetic algorithm;

identifying at least one propensity model that best fits its biased sample of data from each of the plurality of propensity models processed with the genetic algorithm;

identifying a propensity model that best fits a validation sample from the plurality of at least one propensity model that best fits its biased sample of data; and adding the propensity model that best fits a validation sample to each of the plurality of propensity models that correspond to each of the plurality of biased samples of data.

16. The computer-implemented method of developing a propensity model as recited in claim 15, wherein the validation sample of data is unbiased.

17. The computer-implemented method of developing a propensity model as recited in claim 15, comprising processing each of the plurality of propensity models that correspond to each of the plurality of biased samples of data with a genetic algorithm after adding the propensity model that best fits a validation sample to each of the plurality of propensity models that correspond to each of the plurality of biased samples of data.

18. The computer-implemented method of developing a propensity model as recited in claim 17, wherein processing each of the plurality of propensity models that correspond to each of the plurality of biased samples of data with a genetic algorithm after adding the propensity model that best fits a validation sample to each of the plurality of propensity models comprises cross-breeding the propensity model that best fits a validation sample with a propensity model in at least one of the plurality of propensity models that correspond to each biased sample of data.

19. The computer-implemented method of developing a propensity model as recited in claim 17, wherein processing each of the plurality of propensity models that correspond to each of the plurality of biased samples of data with a genetic algorithm after adding the propensity model that best fits a validation sample to each of the plurality of propensity models comprises mutating the propensity model that best fits a validation sample.

20. The computer-implemented method of developing a propensity model as recited in claim 17, comprising storing a copy of each of the plurality of propensity models that best fit its biased sample of data so that the copy of each of the plurality of propensity models that best fit its biased sample of data is not evolved by the genetic algorithm.

21. The computer-implemented method of developing a propensity model as recited in claim 15, comprising:
- identifying at least one propensity model that best fits its biased sample of data from each of the plurality of propensity models processed with the genetic algorithm after cross-breeding;
- identifying a propensity model that best fits a validation sample from the plurality of at least one propensity model that best fits its biased sample of data after cross-breeding; and
- cross-breeding the propensity model that best fits a validation sample from the plurality of at least one propensity model that best fits its biased sample of data after cross-breeding with a propensity model for each of the plurality of biased samples of data.

\* \* \* \* \*